(12) United States Patent
Rached

(10) Patent No.: US 9,599,381 B2
(45) Date of Patent: Mar. 21, 2017

(54) HEAT TRANSFER FLUID

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/873,855

(22) Filed: Oct. 2, 2015

(65) Prior Publication Data

US 2016/0025394 A1    Jan. 28, 2016

Related U.S. Application Data

(63) Continuation of application No. 13/122,606, filed as application No. PCT/FR2009/051814 on Sep. 24, 2009, now abandoned.

(30) Foreign Application Priority Data

Oct. 8, 2008  (FR) ..................... 08 56817
Oct. 9, 2008  (FR) ..................... 08 56836

(51) Int. Cl.
   *C09K 5/04* (2006.01)
   *F25B 45/00* (2006.01)
   *C08J 9/14* (2006.01)

(52) U.S. Cl.
   CPC .............. *F25B 45/00* (2013.01); *C08J 9/146* (2013.01); *C09K 5/045* (2013.01); *C09K 2205/126* (2013.01); *C09K 2205/22* (2013.01); *C09K 2205/43* (2013.01)

(58) Field of Classification Search
   CPC .............. C09K 5/045; C09K 2205/126; C09K 2205/22
   See application file for complete search history.

(56) References Cited

U.S. PATENT DOCUMENTS

| | | | |
|---|---|---|---|
| 6,176,102 B1 | 1/2001 | Novak et al. |
| 6,503,417 B1 | 1/2003 | Bivens |
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 9,011,711 B2 | 4/2015 | Rached |
| 9,028,706 B2 | 5/2015 | Rached et al. |
| 9,039,922 B2 | 5/2015 | Rached |
| 9,046,348 B2 | 6/2015 | Abbas |
| 9,057,010 B2 | 6/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,315,708 B2 | 4/2016 | Guerin et al. |
| 9,399,726 B2 | 7/2016 | Rached |
| 2006/0243944 A1 | 11/2006 | Minor et al. |
| 2007/0069175 A1 | 3/2007 | Thomas et al. |
| 2008/0184731 A1 | 8/2008 | Sienel et al. |
| 2008/0230738 A1 | 9/2008 | Minor et al. |
| 2008/0314073 A1 | 12/2008 | Minor |
| 2009/0120619 A1 | 5/2009 | Sievert |
| 2009/0267019 A1 | 10/2009 | Motta et al. |
| 2009/0314015 A1 | 12/2009 | Minor et al. |
| 2010/0044619 A1 | 2/2010 | Hulse et al. |
| 2010/0122545 A1 | 5/2010 | Minor et al. |
| 2010/0186432 A1 | 7/2010 | Perti et al. |
| 2010/0235063 A1 | 9/2010 | Kawamoto |
| 2010/0319377 A1 | 12/2010 | Moriwaki et al. |
| 2010/0326129 A1 | 12/2010 | Moriwaki et al. |
| 2011/0084228 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0097885 A9 | 4/2012 | Hulse et al. |
| 2012/0144857 A1 | 6/2012 | Rached |
| 2012/0151958 A1 | 6/2012 | Rached |

(Continued)

FOREIGN PATENT DOCUMENTS

| | | |
|---|---|---|
| EP | 2149592 A2 | 3/2010 |
| EP | 2 246 649 A1 | 11/2010 |

(Continued)

OTHER PUBLICATIONS

U.S. Appl. No. 14/371,118, Boussand.
U.S. Appl. No. 14/651,855, Collier, et al.
U.S. Appl. No. 14/651,925, Deur-Bert, et al.
U.S. Appl. No. 14/655,500, Deur-Bert, et al.
U.S. Appl. No. 14/823,430, Rached.
U.S. Appl. No. 14/830,130, Rached.
U.S. Appl. No. 14/772,950, Bonnet, et al.
Third Party Observation for Application No. EP20090759757 submitted Jan. 4, 2014 in corresponding European Application.
International Search Report issued in PCT/FR2009/051814, mailed Feb. 1, 2010, EPO, Rijswijk, NL, 4 pages (English/French language versions).
CAS Reg. No. 754-12-1, Nov. 16, 1984, 1 page.
CAS Reg. No. 75-10-5, Nov. 16, 1984, 1 page.

(Continued)

*Primary Examiner* — John Hardee
(74) *Attorney, Agent, or Firm* — Buchanan Ingersoll & Rooney P.C.

(57) ABSTRACT

Compositions which are based on tetrafluoropropene and more particularly relates to compositions including 60% to 90% by weight of 2,3,3,3-tetrafluoropropene and 10% to 40% by weight of at least one compound selected from difluoroethane and difluoromethane, which can be used as a heat transfer fluid. The compositions may include 60% to 79% by weight of 2,3,3,3-tetrafluoropropene and 21% to 40% by weight of a compound selected from difluoroethane and difluoromethane.

5 Claims, No Drawings

(56) References Cited

U.S. PATENT DOCUMENTS

| | | | |
|---|---|---|---|
| 2012/0151959 | A1 | 6/2012 | Rached |
| 2012/0153213 | A1 | 6/2012 | Rached |
| 2012/0159982 | A1 | 6/2012 | Rached |
| 2012/0161064 | A1 | 6/2012 | Rached |
| 2012/0167615 | A1 | 7/2012 | Rached |
| 2012/0205574 | A1 | 8/2012 | Rached et al. |
| 2012/0255316 | A1 | 10/2012 | Andre et al. |
| 2013/0055733 | A1 | 3/2013 | Rached |
| 2013/0055738 | A1 | 3/2013 | Rached |
| 2013/0092869 | A1 | 4/2013 | Boussand |
| 2013/0096218 | A1 | 4/2013 | Rached |
| 2013/0105724 | A1 | 5/2013 | Boussand |
| 2013/0186114 | A1 | 7/2013 | Guerin et al. |
| 2014/0008565 | A1 | 1/2014 | Rached et al. |
| 2014/0075969 | A1 | 3/2014 | Guerin et al. |
| 2014/0166923 | A1 | 6/2014 | Yana Motta et al. |
| 2014/0318160 | A1 | 10/2014 | Rached |
| 2014/0326017 | A1 | 11/2014 | Rached |
| 2015/0027146 | A1 | 1/2015 | Boussand |
| 2015/0152306 | A1 | 6/2015 | Rached |
| 2015/0152307 | A1 | 6/2015 | Rached |
| 2015/0322317 | A1 | 11/2015 | Collier et al. |
| 2015/0322321 | A1 | 11/2015 | Deur-Bert et al. |
| 2015/0344761 | A1 | 12/2015 | Rached |
| 2015/0353799 | A1 | 12/2015 | Deur-Bert et al. |
| 2015/0353802 | A1 | 12/2015 | Rached |
| 2016/0009555 | A1 | 1/2016 | Bonnet et al. |
| 2016/0024363 | A1 | 1/2016 | Rached |
| 2016/0115361 | A1 | 4/2016 | Boussand |
| 2016/0122609 | A1 | 5/2016 | Rached |
| 2016/0194541 | A1 | 7/2016 | Guerin et al. |
| 2016/0244652 | A1 | 8/2016 | Rached |
| 2016/0272561 | A1 | 9/2016 | Rached et al. |
| 2016/0298014 | A1 | 10/2016 | Rached |

FOREIGN PATENT DOCUMENTS

| | | |
|---|---|---|
| FR | 2 182 956 A3 | 12/1973 |
| FR | 2 256 381 A | 7/1975 |
| JP | 4-11388 | 4/1992 |
| JP | 4-110388 | 4/1992 |
| JP | 2000-161805 | 6/2000 |
| JP | 2008-074942 A | 4/2008 |
| JP | 2008-103763 A | 5/2008 |
| JP | 2008-134031 A | 6/2008 |
| JP | 2008-159353 A | 7/2008 |
| JP | 2008-531836 A | 8/2008 |
| JP | 2009-177860 A | 8/2009 |
| RU | 2 189 544 C2 | 9/2002 |
| WO | WO 2004/037913 | 5/2004 |
| WO | WO 2005/105947 | 11/2005 |
| WO | WO 2006/009303 | 9/2006 |
| WO | WO 2006/094303 A2 | 9/2006 |
| WO | WO 2006/094303 A3 | 9/2006 |
| WO | WO 2006/101563 A2 | 9/2006 |
| WO | WO 2006/101563 A3 | 9/2006 |
| WO | WO 2007/126414 | 8/2007 |
| WO | WO 2008/009922 A2 | 1/2008 |
| WO | WO 2008/027555 A2 | 3/2008 |
| WO | WO 2008/140809 A2 | 11/2008 |
| WO | WO 2009/107364 A1 | 9/2009 |
| WO | WO 2009/110228 A1 | 9/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/002016 A1 | 1/2010 |
| WO | WO 2010/002023 A1 | 1/2010 |
| WO | WO 2010/040928 A1 | 4/2010 |
| WO | WO 2010/059677 A2 | 5/2010 |
| WO | WO 2010/059677 A3 | 5/2010 |
| WO | WO 2010/061084 A1 | 6/2010 |

OTHER PUBLICATIONS

Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/651,925 entitled "Composition Containing 2,3,3,3-Tetrafluoropropene and 1,2-Difluoroethylene," filed in the U.S. Patent and Trademark Office on Jun. 12, 2015.
Deur-Bert, Dominique, et al., U.S. Appl. No. 14/655,500 entitled "Azeotropic or Quasi-Azeotropic Composition of Chloromethane," filed in the U.S. Patent and Trademark Office on Jun. 25, 2015.
Rached, Wissam, U.S. Appl. No. 14/823,430 entitled "Use of Ternary Compositions," filed in the U.S. Patent and Trademark Office on Aug. 11, 2015.
Rached, Wissam, U.S. Appl. No. 14/830,130 entitled "Binary Refrigerating Fluid," filed in the U.S. Patent and Trademark Office on Aug. 19, 2015.
Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.
Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/651,925 entitled "Composition Containing 2,3,3,3-Tetrafluoropene and 1,2-Difluoroethylene," filed in the U.S. Patent and Trademark Office on Jun. 12, 2015.
Deur-Bert, Dominique, et al. U.S. Appl. No. 14/655,500 entitled "Azeotropic or Quasi-Azeotropic Composition of Chloromethane," filed in the U.S. Patent and Trademark Office on Jun. 25, 2015.
U.S. Appl. No. 14/873,891, Rached.
Rached, Wissam, U.S. Appl. No. 14/873,891 entitled "Ternary Compositions for Low-Capacity Refrigeration," filed in the U.S. Patent and Trademark Office on Oct. 2, 2015.
Guérin, Sophie, et al., U.S. Appl. No. 14/903,461 entitled, "2,3,3,3-Tetrafluoropene Compositions Having Improved Miscibility," filed in the U.S. Patent and Trademark Office on Jan. 7, 2016.
U.S. Appl. No. 14/903,461, Guerin et al.
U.S. Appl. No. 14/990,159, Boussand, et al.
U.S. Appl. No. 14/992,387, Rached.
U.S. Appl. No. 15/070,955, Guerin et al.
U.S. Appl. No. 15/073,108, Rached et al.
Boussand, Beatrice, et al., U.S. Appl. No. 14/990,159, entitled "Stable 2,3,3,3-Tetrafluoropropene Composition," filed in the U.S. Patent and Trademark office on Jan. 7, 2016.
Rached, Wissam, U.S. Appl. No. 14/992,387 entitled, "Ternary Compositions for High-Capacity Refrigeration," filed in the U.S. Patent and Trademark Office on Jan. 11, 2016.
Guerin, Sophie, et al., U.S. Appl. No. 15/070,955, entitled "Heat-Transfer Compositions Exhibiting Improved Miscibility with the Lubricating Oil," filed in the U.S. Patent and Trademark Office Mar. 15, 2016.
Rached, Wissam, et al., U.S. Appl. No. 15/073,108 entitled "Stabilization of 1-Chloro-3,3,3-Trifluoropropene," filed in the U.S. Patent and Trademark Office on Mar. 17, 2016.
Bigot, G., et al., "Optimized Design of Heat Exchangers for "Reversible" Heat Pump Using R-407C," Paper 463, *Eighth International Refrigeration and Air Conditioning Conference at Purdue University*, West Lafayette, IN, USA, Jul. 25-28, 2000, pp. 38-46, Purdue University, Purdue e-Pubs, http://docs.lib.purdue.edu/iracc./463.
Liu, X., "Efficiency of Non-Azeotropic Refrigerant Cycle," *International Refrigeration and Air Conditioning Conference*, Paper 396, 1998, pp. 108-114, Purdue University, Purdue e-Pubs, http://docs.lib.purdue.edu/iracc/396.
Rached, Wissam, U.S. Appl. No. 15/238,883 entitled "Heat Transfer Fluid Replacing R-134a," filed in the U.S. Patent and Trademark Office on Aug. 17, 2016.
Rached, Wissam, et al., U.S. Appl. No. 15/297,569 entitled "Composition Based on 2,3,3,3-Tetrafluoropropene," filed in the U.S. Patent and Trademark Office on Oct. 19, 2016.
U.S. Appl. No. 15/238,883, Rached.
U.S. Appl. No. 15/297,569, Rached et al.

HEAT TRANSFER FLUID

CROSS REFERENCE TO RELATED APPLICATIONS

The present application is a continuation of U.S. application Ser. No. 13/122,606, filed on Apr. 5, 2011, now abandoned, which is a U.S. national stage of International Application No. PCT/FR2009/051814, filed on Sep. 24, 2009, which claims the benefit of French Application No. 08.56836, filed on Oct. 9, 2008 and French Application No. 08.56817, filed on Oct. 8, 2008. The entire contents of each of U.S. application Ser. No. 13/122,606, International Application No. PCT/FR2009/051814, French Application No. 08.56836, and French Application No. 08.56817 are hereby incorporated herein by reference in their entirety.

FIELD OF INVENTION

The present invention relates to compositions comprising hydrofluoroolefins and to their uses as heat transfer fluids, blowing agents, solvents and aerosols.

BACKGROUND AND SUMMARY

The problems posed by substances which deplete the atmospheric ozone layer (ODP: ozone depletion potential) were tackled at Montreal, where a protocol was signed which imposes a reduction on the production and use of chlorofluorocarbons (CFCs). This protocol has been the subject of amendments, which have imposed the abandonment of CFCs and have extended the regulations to other products, among them hydrochlorofluorocarbons (HCFCs).

The refrigeration industry and the air conditioning industry have invested much in the replacement of these refrigerant fluids, and a product of this investment has been the commercialization of hydrofluorocarbons (HFCs).

(Hydro)chlorofluorocarbons which are used as expandants or solvents have also been replaced by HFCs.

In the automotive industry, the air-conditioning systems of vehicles which are sold in many countries have switched from a chlorofluorocarbon (CFC-12) refrigerant fluid to that of a hydrofluorocarbon (1,1,1,2-tetrafluoroethane: HFC-134a), which is less harmful to the ozone layer. However, in view of the objectives set by the Kyoto Protocol, HFC-134a (GWP=1300) is considered to have a high warming potential. The contribution to the greenhouse effect of a fluid is quantified by a criterion, the GWP (global warming potential), which indexes the warming potential by taking a reference value of 1 for carbon dioxide.

Carbon dioxide, being non-toxic, non-flammable and having a very low GWP, has been proposed as a refrigerant fluid for air-conditioning systems, as a replacement for HFC-134a. However, the use of carbon dioxide presents a number of disadvantages, associated in particular with the very high pressure of its use as a refrigerant fluid in existing apparatus and technologies.

Moreover, the mixture R-404A, composed of 44% by weight of pentafluoroethane, 52% by weight of trifluoroethane and 4% by weight of HFC-134a, is widely used as a refrigerant fluid in superstores (supermarket) and in refrigerated transport. This mixture, however, has a GWP of 3900. The mixture R-407C, composed of 52% by weight of HFC-134a, 25% by weight of pentafluoroethane and 23% by weight of difluoromethane, is used as a heat transfer fluid in air conditioning and in heat pumps. This mixture, however, has a GWP of 1800.

Document JP 4110388 describes the use of hydrofluoropropenes of formula $C_3H_mF_n$, where m and n represent an integer between 1 and 5 inclusive and m+n=6, as heat transfer fluids, especially tetrafluoropropene and trifluoropropene.

Document WO 2004/037913 discloses the use of compositions comprising at least one fluoroalkene having three or four carbon atoms, more particularly pentafluoropropene and tetrafluoropropene, preferably having a GWP of not more than 150, as heat transfer fluids.

Document WO 2005/105947 teaches the addition to tetrafluoropropene, preferably 1,3,3,3-tetrafluoropropene, of a co-blowing agent such as difluoromethane, pentafluoroethane, tetrafluoroethane, difluoroethane, heptafluoropropane, hexafluoropropane, pentafluoropropane, pentafluorobutane, water or carbon dioxide.

Document WO 2006/094303 discloses an azeotropic composition containing 7.4% by weight of 2,3,3,3-tetrafluoropropene (1234yf) and 92.6% by weight of difluoromethane (HFC-32). This document likewise discloses an azeotropic composition containing 91% by weight of 2,3,3,3-tetrafluoropropene and 9% by weight of difluoroethane (HFC-152a).

DETAILED DESCRIPTION

The applicant has now developed compositions which contain hydrofluoropropenes, which can be used as a heat transfer fluid, which do not have the aforementioned drawbacks and which combine a zero ODP with a GWP lower than that of existing heat transfer fluids such as R-404A or R-407C or R22 (chlorodifluoromethane).

The compositions according to the present invention are characterized in that they comprise 60% to 90% by weight of 2,3,3,3-tetrafluoropropene and 10% to 40% by weight of at least one compound selected from difluoroethane and difluoromethane.

According to a first embodiment of the invention the compositions comprise 60% to 79% by weight of 2,3,3,3-tetrafluoropropene and 21% to 40% by weight of a compound selected from difluoroethane and difluoromethane.

The compositions according to this first embodiment preferably comprise 60% to 70% by weight of 2,3,3,3-tetrafluoropropene and 30% to 40% by weight of a compound selected from difluoroethane and difluoromethane.

Advantageously the compositions according to this first embodiment comprise 60% to 65% by weight of 2,3,3,3-tetrafluoropropene and 35% to 40% by weight of a compound selected from difluoroethane and difluoromethane.

The compositions which are particularly preferred according to this first embodiment comprise 2,3,3,3-tetrafluoropropene and difluoromethane.

Advantageously these compositions contain essentially 2,3,3,3-tetrafluoropreopene and difluoromethane.

According to a second embodiment of the invention the compositions comprise 60% to 90% by weight of 2,3,3,3-tetrafluoropropene and 10% to 40% by weight of a mixture composed of dichloromethane and difluoroethane.

The compositions which are preferred according to this second embodiment comprise 60% to 80% by weight of 2,3,3,3-tetrafluoropropene and 20% to 40% by weight of a mixture composed of difluoromethane and difluoroethane.

The compositions which are advantageously preferred according to this second embodiment comprise 60% to 75% by weight of 2,3,3,3-tetrafluoropropene and 25% to 40% by weight of a mixture composed of difluoromethane and difluoroethane.

Particularly preferred compositions comprise 60% to 80% by weight of 2,3,3,3-tetrafluoropropene and 5% to 35% by weight of difluoromethane and 5% to 35% by weight of difluoroethane.

The compositions which are of interest are those comprising or containing essentially 60% to 80% by weight of 2,3,3,3-tetrafluoropropene and 10% to 30% by weight of difluoromethane and 10% to 30% by weight of difluoroethane.

The compositions according to the invention may comprise a stabilizer for 2,3,3,3-tetrafluoropropene. The stabilizer represents not more than 5% by weight, relative to the total composition.

Stabilizers include more particularly nitromethane, ascorbic acid, terephthalic acid, azoles such as tolutriazole or benzotriazole, phenolic compounds such as tocopherol, hydroquinone, tert-butylhydroquinone, 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl glycidyl ether and butylphenyl glycidyl ether, phosphites, phosphates, phosphonates, thiols and lactones.

The compositions according to the present invention may comprise lubricants such as mineral oil, alkylbenzene, polyalkylene glycol and polyvinyl ether.

The compositions according to the present invention are suitable for replacing R-404A in refrigeration and/or R-407C in air conditioning and heat pumps in existing systems. They may also be suitable for replacing R-404A in refrigeration systems with a cascaded compression regime in which at least one stage is operated with the compositions according to the present invention. Examples of compositions which are of particular interest for the replacement of R-404A in existing systems include those comprising or containing essentially 60% by weight of 2,3,3,3-tetrafluoropropene and 40% by weight of difluoromethane; 70% by weight of 2,3,3,3-tetrafluoropropene and 30% by weight of difluoromethane; and 60% by weight of 2,3,3,3-tetrafluoropropene, 30% by weight of difluoromethane and 10% by weight of difluoroethane.

Examples of compositions which are of particular interest for the replacement of R-404A in systems operating with a cascaded compression regime include those comprising or containing essentially 60% by weight of 2,3,3,3-tetrafluoropropene and 40% by weight of difluoroethane; 70% by weight of 2,3,3,3-tetrafluoropropene and 30% by weight of difluoroethane; and 75% by weight of 2,3,3,3-tetrafluoropropene, 20% by weight of difluoromethane and 5% by weight of difluoroethane.

The compositions according to the present invention may also be used as a replacement for R-407C, for example in heat pumps.

Examples of compositions which are of particular interest for the replacement of R-407C in existing systems include those comprising or containing essentially 60% by weight of 2,3,3,3-tetrafluoropropene and 40% by weight of difluoromethane; 70% by weight of 2,3,3,3-tetrafluoropropene and 30% by weight of difluoromethane; 60% by weight of 2,3,3,3-tetrafluoropropene, 30% by weight of difluoromethane and 10% by weight of difluoroethane; and 70% by weigh of 2,3,3,3-tetrafluoropropene, 25% by weight of difluoromethane and 5% by weight of difluoroethane.

The compositions according to the present invention can be used, furthermore, as blowing agents, aerosols and solvents.

EXPERIMENTAL SECTION

The performance data of the compositions according to the invention under the operating conditions of refrigeration are given in Table 1. The values of the constituents (1234yf, 32 and 152a) for each composition are given as percentages by weight.

For R404A, the nominal operating pressure is 18 bar, the volumetric capacity is 1500 kJ/m$^3$ and the COP is 1.8 under the following operating conditions:
Evaporation temperature: −20° C.
Condensation temperature: 40° C.
Compressor inlet temperature: −5° C.
Super cooled liquid temperature: 33° C.
Isentropic yield of the compressor: 70%
BP: pressure at the evaporator
HP: pressure at the condenser
Ratio: compression ratio
T comp outlet: temperature at the compressor outlet
COP: coefficient of performance—defined, for the purposes of refrigeration, as being the useful cooling power supplied by the system, as a proportion of the power provided or consumed by the system.
CAP: volumetric capacity (kJ/m$^3$)
% CAP or COP is the ratio of the value of the CAP or COP of the mixture in relation to the same value for R404A.

TABLE 1

| Compositions | | | BP (bar) | HP (bar) | Ratio (p/p) | T comp. outlet | % COP | % CAP |
|---|---|---|---|---|---|---|---|---|
| R404A | | | 3 | 18 | 6.10 | 77 | 100 | 100 |
| 1234yf | 32 | 152a | | | | | | |
| 60 | 40 | 0 | 2.7 | 21 | 7.57 | 111 | 96 | 102 |
| 70 | 30 | 0 | 2.4 | 19 | 8.02 | 104 | 94 | 89 |
| 75 | 25 | 0 | 2.2 | 18 | 8.19 | 101 | 94 | 83 |
| 60 | 20 | 20 | 2.0 | 16 | 8.01 | 100 | 98 | 76 |
| 60 | 30 | 10 | 2.3 | 18 | 7.94 | 106 | 96 | 88 |
| 70 | 25 | 5 | 2.2 | 18 | 8.10 | 101 | 95 | 83 |
| 70 | 20 | 10 | 2.0 | 16 | 8.07 | 98 | 96 | 77 |
| 75 | 20 | 5 | 2.0 | 16 | 8.16 | 97 | 95 | 77 |
| 75 | 15 | 10 | 1.9 | 15 | 8.01 | 93 | 97 | 72 |
| 85 | 10 | 5 | 1.8 | 14 | 7.92 | 86 | 99 | 67 |
| 60 | 0 | 40 | 1.5 | 10 | 6.60 | 79 | 114 | 59 |
| 70 | 0 | 30 | 1.5 | 10 | 6.53 | 76 | 113 | 59 |

The performance data of the compositions according to the present invention under the operating conditions of a heat pump and air conditioning are given in Table 2. The values of the constituents (1234yf, 32 and 152a) for each composition are given as percentages by weight.

For R407C, the nominal operating pressure is 34 bar, the volumetric capacity is 1461 kJ/m$^3$ and the COP is 2.1 under the following operating conditions:
Evaporation temperature: −5° C.
Condensation temperature: 70° C.
Compressor inlet temperature: 5° C.
Supercooled liquid temperature: 65° C.
Isentropic yield of the compressor: 70%
BP: pressure at the evaporator
HP: pressure at the condenser
Ratio: compression ratio
T comp outlet: temperature at the compressor outlet
COP: coefficient of performance—defined, for the purposes of a heat pump, as being the useful heating power supplied by the system, as a proportion of the power provided or consumed by the system.
CAP: volumetric capacity (kJ/m$^3$)
% CAP or COP is the ratio of the value of the CAP or COP of the mixture in relation to the same value for the R-407C.

TABLE 2

| Compositions | | | BP (bar) | HP (bar) | Ratio (p/p) | T comp. outlet | % COP | % CAP |
|---|---|---|---|---|---|---|---|---|
| R407C | | | 3.9 | 34.4 | | 127 | 100 | 100 |
| 1234yf | 32 | 152a | | | | | | |
| 60 | 40 | 0 | 4.8 | 39.7 | 8.30 | 133 | 91.9 | 112 |
| 70 | 30 | 0 | 4.2 | 36.5 | 8.69 | 126 | 92.4 | 99 |
| 75 | 25 | 0 | 3.9 | 34.6 | 8.85 | 122 | 93.2 | 93 |
| 60 | 20 | 20 | 3.5 | 30.1 | 8.64 | 121 | 101.5 | 89 |
| 60 | 30 | 10 | 4.1 | 35.0 | 8.60 | 128 | 97.1 | 101 |
| 70 | 25 | 5 | 3.9 | 33.9 | 8.74 | 123 | 95.5 | 94 |
| 70 | 20 | 10 | 3.6 | 31.2 | 8.70 | 119 | 98.3 | 88 |
| 75 | 20 | 5 | 3.6 | 31.8 | 8.79 | 118 | 96.4 | 88 |
| 75 | 15 | 10 | 3.3 | 28.9 | 8.64 | 113 | 99.3 | 82 |
| 85 | 10 | 5 | 3.1 | 26.7 | 8.58 | 107 | 99.3 | 75 |
| 60 | 0 | 40 | 2.6 | 18.9 | 7.27 | 98 | 113.7 | 67 |
| 70 | 0 | 30 | 2.7 | 19.1 | 7.19 | 95 | 111.3 | 66 |

The invention claimed is:

1. A method of replacing R22 in a heat pump or air conditioner, the method comprising replacing a first heat transfer fluid of R22 with a second heat-transfer fluid comprising a composition consisting of 60% to 65% by weight of 2,3,3,3-tetrafluoropropene and 35% to 40% by weight of difluoromethane, and optionally a stabilizer.

2. The method as claimed in claim 1, wherein the composition consists of 65% by weight of 2,3,3,3-tetrafluoropropene and 35% of difluoromethane, and optionally a stabilizer.

3. The method as claimed in claim 1, wherein the composition further contains the stabilizer.

4. The method as claimed in claim 3, wherein the stabilizer is selected from the group consisting of nitromethane, ascorbic acid, terephthalic acid, azoles, phenolic compounds, epoxides, phosphites, phosphates, phosphonates, thiols and lactones.

5. The method as claimed in claim 3, wherein stabilizer represents at most 5% by weight relative to the refrigerant.

* * * * *